UNITED STATES PATENT OFFICE.

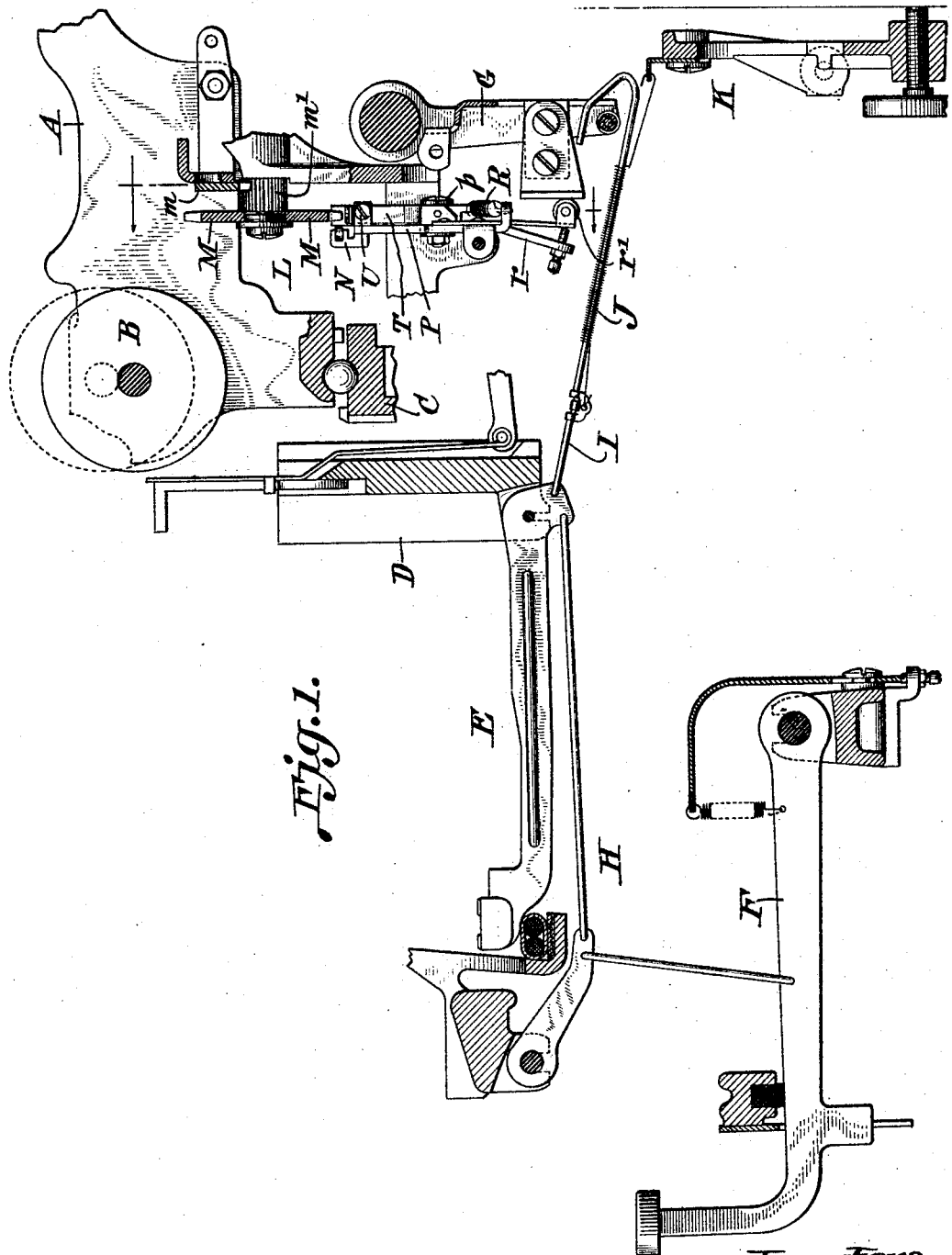

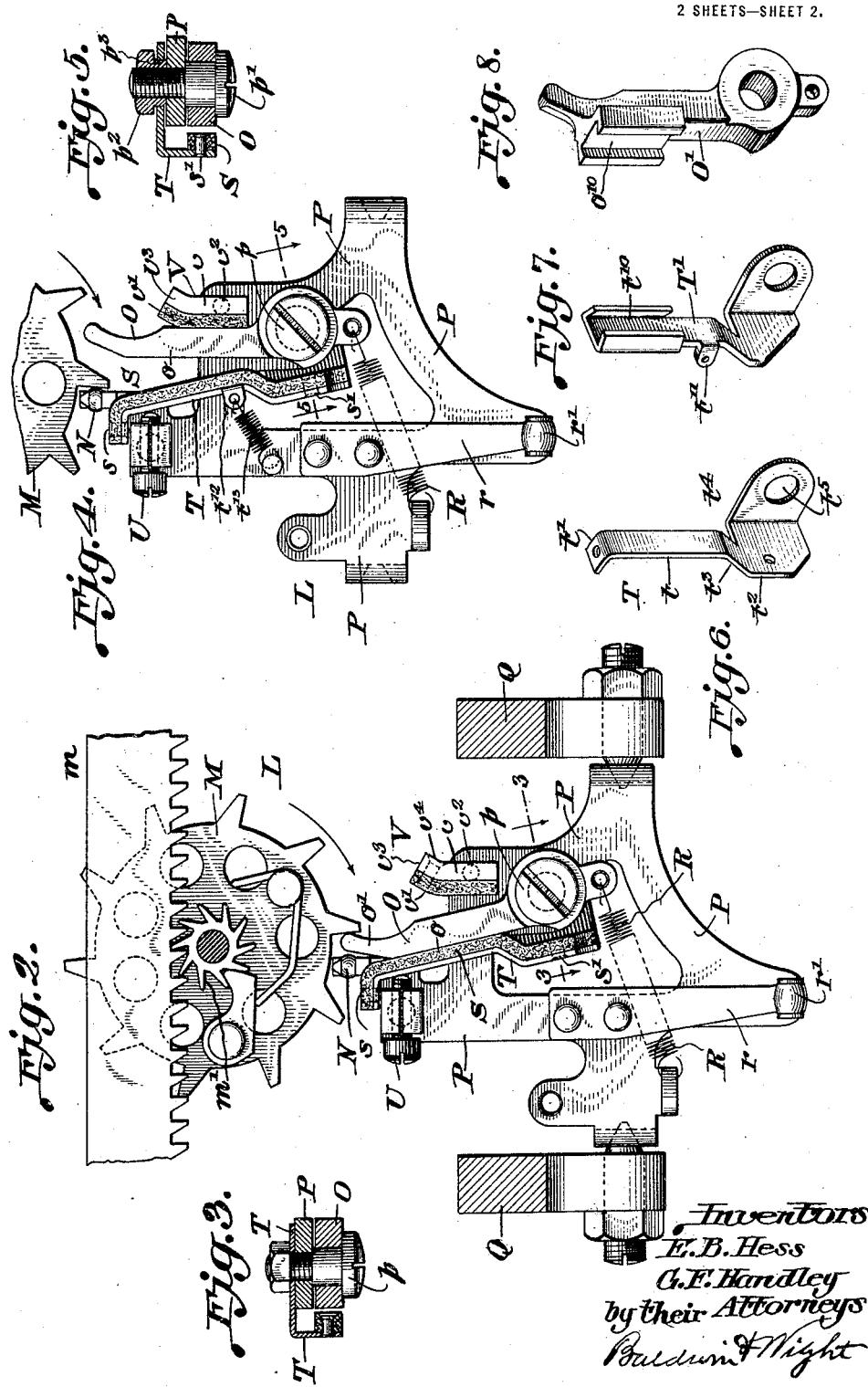

EDWARD B. HESS, OF MANHATTAN BEACH, AND GEORGE F. HANDLEY, OF GLENDALE, NEW YORK, ASSIGNORS TO ROYAL TYPEWRITER COMPANY, INC., OF NEW YORK, N. Y., A CORPORATION OF NEW YORK.

TYPEWRITING MACHINE.

1,415,558.          Specification of Letters Patent.        Patented May 9, 1922.

Application filed August 24, 1921. Serial No. 495,041.

*To all whom it may concern:*

Be it known that we, EDWARD B. HESS and GEORGE F. HANDLEY, both citizens of the United States, the former residing in Manhattan Beach, county of Kings, New York, N. Y., and the latter in Glendale, in the county of Queens and State of New York, have invented certain new and useful Improvements in Typewriting Machines, of which the following is a specification.

This invention relates to the escapement mechanism of typewriting machines, and the object of the invention is to provide means for muffling the sounds produced during the operation of such mechanism.

Ordinarily the escapement mechanism of typewriting machines includes what are known as fixed or rigid dogs and limber or pivoted dogs, which engage the escapement wheel. These dogs are mounted on a rocker which is operated by a universal bar. As the rocker vibrates, the limber dog moves back and forth on its pivot and considerable noise is produced.

According to our invention, means is provided for muffling or materially reducing this noise.

In carrying out our invention, we provide a pad or cushion made of soft or sound deadening material against which the limber dog normally rests and which it strikes when moved in one direction, and we also preferably provide a second pad against which the limber dog strikes when moving in the opposite direction. These pads are mounted in a novel way on the rocker and means are provided for adjusting one of the pads if required. In a modified construction a pad is attached to the limber dog instead of being held in a fixed position on the rocker.

In the accompanying drawings:—

Figure 1 is a side elevation of part of the mechanism of a typewriting machine of the Royal type, and illustrates certain features of our present invention.

The remaining figures are on an enlarged scale.

Figure 2 shows a rear view of portions of the escapement mechanism.

Figure 3 shows a section on the line 3—3 of Figure 2.

Figure 4 is a rear elevation similar to Figure 2, but showing certain modifications and showing the limber dog in a different position from that shown in Figure 2.

Figure 5 is a section on the line 5—5 of Figure 4.

Figure 6 is a perspective view of a frame for one of the pads.

Figure 7 shows a modified form of pad frame.

Figure 8 is a perspective view of a limber dog provided with means for holding a pad.

Part of a typewriter carriage is indicated at A, and B indicates a platen. A shift rail is shown at C and a type bar segment at D. One of the type bars is illustrated at E which is connected to a key lever F by the devices H which form no part of the present invention, and are claimed in an application of Edward B. Hess filed July 1, 1921.

The universal bar G is connected with the heels of the type bars by links I and the heels of the type bars are also connected by springs J to a support K. This last described mechanism is also not claimed herein, as it is the sole invention of Edward B. Hess and is claimed by him in his application for patent of July 1, 1921 above mentioned.

The escapement mechanism is designated generally by the reference character L. In general it is similar to the escapement mechanism of the Royal standard machine. The toothed rack $m$ is engaged by a pinion $m'$ on the shaft of the escapement wheel M, and this wheel is engaged at times by the fixed or rigid dog N and the limber or pivoted dog O. These dogs are mounted on the rocker P which is pivotally mounted in a frame Q. The rocker carries a spring arm $r$ supporting a roller $r'$ which engages the universal bar in the manner indicated in Figure 1.

The limber dog O is pivotally connected with the rocker in the manner indicated in Figure 3 by a screw $p$ and it is pulled in one direction by a spring R in the usual way. The operation of the rocker and dogs is as usual, i. e. as the rocker oscillates the limber dog releases the escapement wheel and the rigid dog then engages said wheel and the limber dog enters between the next teeth in the series. On the next movement of the rocker, the limber dog re-enters the wheel and the latter moves one space, at the same time moving the limber dog about its pivot.

This movement is a quick, sharp one and ordinarily produces noise. The return movement of the dog likewise is quick and sharp and produces noise. In order to absorb these shocks and muffle and reduce the sounds, we provide sound absorbing or muffling devices of the kind shown. Preferably we provide the limber dog with an extended bearing surface $o$ and turn the upper end of the dog to one side as indicated at $o'$. This dog O is pivotally mounted on the screw $p$ as indicated in Figure 3. In order to provide a rest for the limber dog and to absorb noise, we provide a pad S of relatively soft or sound absorbing material, such as felt or leather. The pad is carried by a frame T which is secured to the rocker by the screw $p$. The frame is shown in perspective in Figure 6. It comprises a middle part $t$, which is straight and flat, and an upper part $t'$, which is bent to one side, and a lower part $t^2$, which is connected to the middle part by a bend $t^3$. This lower part is enlarged and is provided with an arm $t^4$ perforated at $t^6$ to receive the screw $p$.

The pad S is attached to the frame at $s$, $s'$ and the arrangement is such that the fastening devices will not come in contact with the dog. Normally the limber dog rests against the pad which as indicated in Figure 2 is fixed, but its position may be adjusted by means of a set screw U. After the dog has left the pad and has returned thereto, the shock of the movement is received by the pad and the noise is muffled.

Instead of employing a frame such as shown in Figure 6, we may employ a frame of the kind shown in Figure 7. In this case the frame T' is formed at its lower end similarly to the frame shown in Figure 6, but the upper end of the frame instead of being bent as shown in Figure 6 is formed with a socket $t^{10}$ adapted to receive a pad. It is also formed with a lug $t^{11}$ for the attachment of a spring in the manner indicted in Figure 4.

The construction shown in Figure 4 is similar to that illustrated in Figure 1 except that in this case the frame T is provided with a lug $t^{12}$ to which is attached a spring $t^{13}$ which serves to hold the frame against the screw U. In this case also, the dog O is connected with the rocker by the screw $p'$ carrying a nut $p^2$ having a boss $p^3$ on which the frame T is pivoted. This allows the frame to be drawn against the screw U by the spring $t^{13}$. The position of the pad relatively to the limber dog may be adjusted by the screw U minutely, but the pad is always held in its adjusted position by the spring.

In Figure 8 we have illustrated a modification in which the limber dog O' is provided with a dove tail socket $o^{10}$ in which the pad may be held.

We may also employ a pad V for receiving the impact of the limber dog when moving in one direction. This pad comprises a frame $v$ carrying sound absorbing material $v'$. The pad frame is attached to the rocker at $v^2$ and its upper end is bent at $v^3$ so that the dog will not strike against the securing device $v^4$ which attaches the soft pad to its frame. By these means the limber dog is normally held on a pad of soft material and as it vibrates, its movements are cushioned in both directions and sounds which would otherwise be objectionable are so materially reduced as to be negligible.

It will be observed that the limber dog is in engagement with the pad S when the machine carriage is at rest, at which time the tooth of the escapement wheel which controls the carriage movement is in engagement with the free end of the limber dog and carries it against its stop, which according to our invention is a pad of sound absorbing material. This pad, as shown in Figure 2, acts as a rest for the limber dog when the type bar is in the position shown in Figure 1. When the type bar has released the escapement mechanism and the limber dog has been released, and the escapement wheel has been resting on the rigid dog, said limber dog will rest on the pad V. Thus the pad shown acts as rests for the limber dog as well as stops therefor.

We claim as our invention:

1. In a typewriting machine, escapement mechanism comprising a dog rocker, fixed and limber dogs carried thereby, said limber dog having an extended bearing surface and a bent outer end, a pad against which the limber dog strikes having an extended bearing surface for the dog and bent ends removed from contact with the dog, and means for adjusting the position of the pad.

2. In a typewriting machine, escapement mechanism comprising an escapement wheel, a rocker, a fixed dog, a limber dog having an extending bearing surface and a bent outer end, and a pad against which the limber dog strikes, having an extended bearing surface for the dog and bent opposite ends removed from contact with the dog.

3. In a typewriting machine, escapement mechanism comprising a dog rocker, a fixed dog thereon, a limber dog pivotally mounted on the rocker, and a pad comprising a frame attached to the rocker by the limber dog pivot and a layer of soft sound absorbing material carried by one side of the frame.

4. In a typewriting machine, escapement mechanism comprising a dog rocker, a fixed dog thereon, a limber dog pivotally mounted on the rocker, and a pad comprising a frame pivotally mounted on the rocker, a spring for holding the pad in normal position, and means for adjusting the pad on the rocker relatively to the limber dog.

5. In a typewriting machine, escapement mechanism comprising a dog rocker, a fixed dog thereon, a limber dog pivotally mounted on the rocker, a pad comprising a frame pivotally attached to the rocker by the limber dog pivot, a layer of soft material carried by the frame, and means for adjusting the position of the pad relatively to the limber dog.

6. In a typewriting machine, escapement mechanism comprising a dog rocker, a fixed dog thereon, a limber dog pivoted thereon, and a pad on each side of the limber dog, each pad comprising a frame and a layer of soft material and mounted to engage the edge of the limber dog throughout a considerable distance thereby preventing the noise usually caused by a vibration of the limber dog.

7. In a typewriting machine, escapement mechanism comprising a dog rocker, a fixed dog thereon, a limber dog pivotally mounted on the rocker, and a pad on each side of the limber dog to limit its movements, each pad comprising a frame and a layer of soft material having an extended bearing surface for the dog and a bent end removed from contact with the dog.

In testimony whereof, we have hereunto subscribed our names.

EDWARD B. HESS.
GEORGE F. HANDLEY.